(12) United States Patent
Ikeda

(10) Patent No.: US 9,204,002 B2
(45) Date of Patent: Dec. 1, 2015

(54) ELECTRONIC DEVICE WITH KEYS, CONTROL METHOD THEREOF, AND STORAGE MEDIUM

(71) Applicant: CANON KABUSHIKI KAISHA, Tokyo (JP)

(72) Inventor: Atsushi Ikeda, Tokorozawa (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/303,981

(22) Filed: Jun. 13, 2014

(65) Prior Publication Data
US 2014/0376018 A1   Dec. 25, 2014

(30) Foreign Application Priority Data
Jun. 19, 2013   (JP) .................................. 2013-128532

(51) Int. Cl.
G06F 3/12   (2006.01)
H04N 1/00   (2006.01)

(52) U.S. Cl.
CPC ....... *H04N 1/00925* (2013.01); *H04N 1/00384* (2013.01); *H04N 1/00387* (2013.01); *H04N 1/00496* (2013.01); *H04N 2201/0091* (2013.01); *H04N 2201/0094* (2013.01)

(58) Field of Classification Search
None
See application file for complete search history.

(56) References Cited

U.S. PATENT DOCUMENTS

| 8,164,765 | B2 * | 4/2012 | Anno et al. ................... 358/1.13 |
| 8,253,807 | B2 * | 8/2012 | Hatanaka ................... 348/207.1 |
| 2001/0033396 | A1 * | 10/2001 | Sheng ........................... 358/468 |
| 2005/0012940 | A1 * | 1/2005 | Matsuda ....................... 358/1.1 |
| 2008/0174818 | A1 * | 7/2008 | Kanamoto ................... 358/1.15 |

FOREIGN PATENT DOCUMENTS

JP   2001-320550 A   11/2001

* cited by examiner

*Primary Examiner* — Marcus T Riley
(74) *Attorney, Agent, or Firm* — Rossi, Kimms & McDowell LLP

(57) ABSTRACT

An electronic device with keys which is capable of improving the user's usability for the keys, wherein processes allocated to the keys can be switched. A switching unit switches processes allocated to at least a part of the plurality of keys according to a predetermined operation. A determination unit determines whether or not the switching unit is in a normal state. An invalidation unit invalidates a part of the plurality of keys in a case where the determination unit determines that the switching unit is not in the normal state. An execution unit executes, when the key not invalidated by the invalidation unit among the plurality of keys is pressed, a process allocated to the pressed key, in a case where the determination unit determines that the switching unit is not in the normal state.

11 Claims, 6 Drawing Sheets

| COVER OPENING-CLOSING SENSING SWITCH 5 | COVER OPENING-CLOSING SENSING SWITCH 6 | STATE |
|---|---|---|
| OFF | OFF | NORMAL STATE (OPEN) |
| OFF | ON | MALFUNCTION STATE |
| ON | OFF | MALFUNCTION STATE |
| ON | ON | NORMAL STATE (CLOSED) |

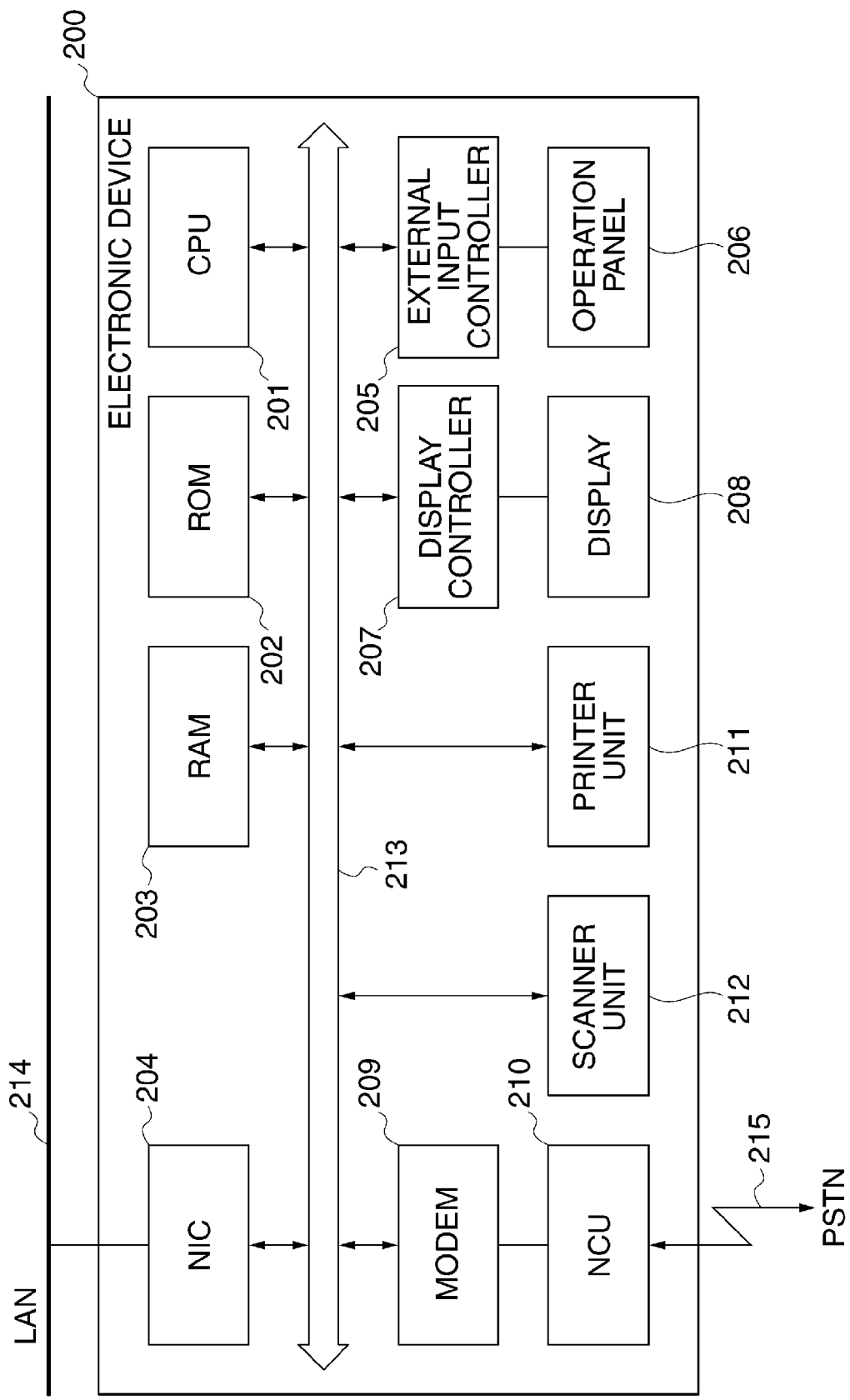

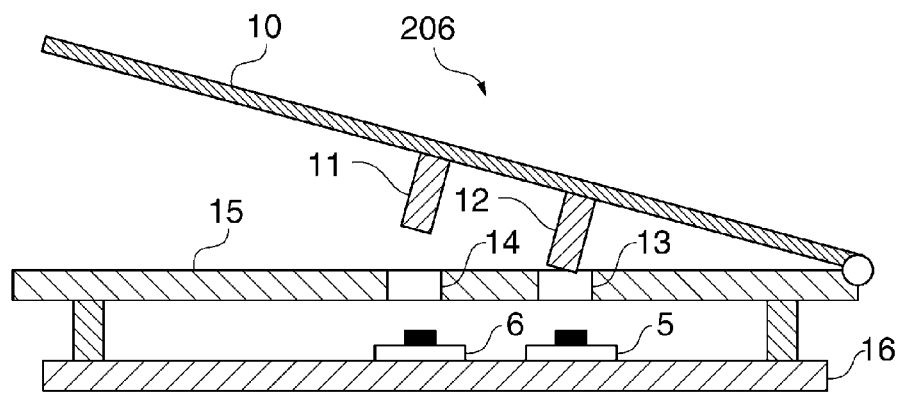
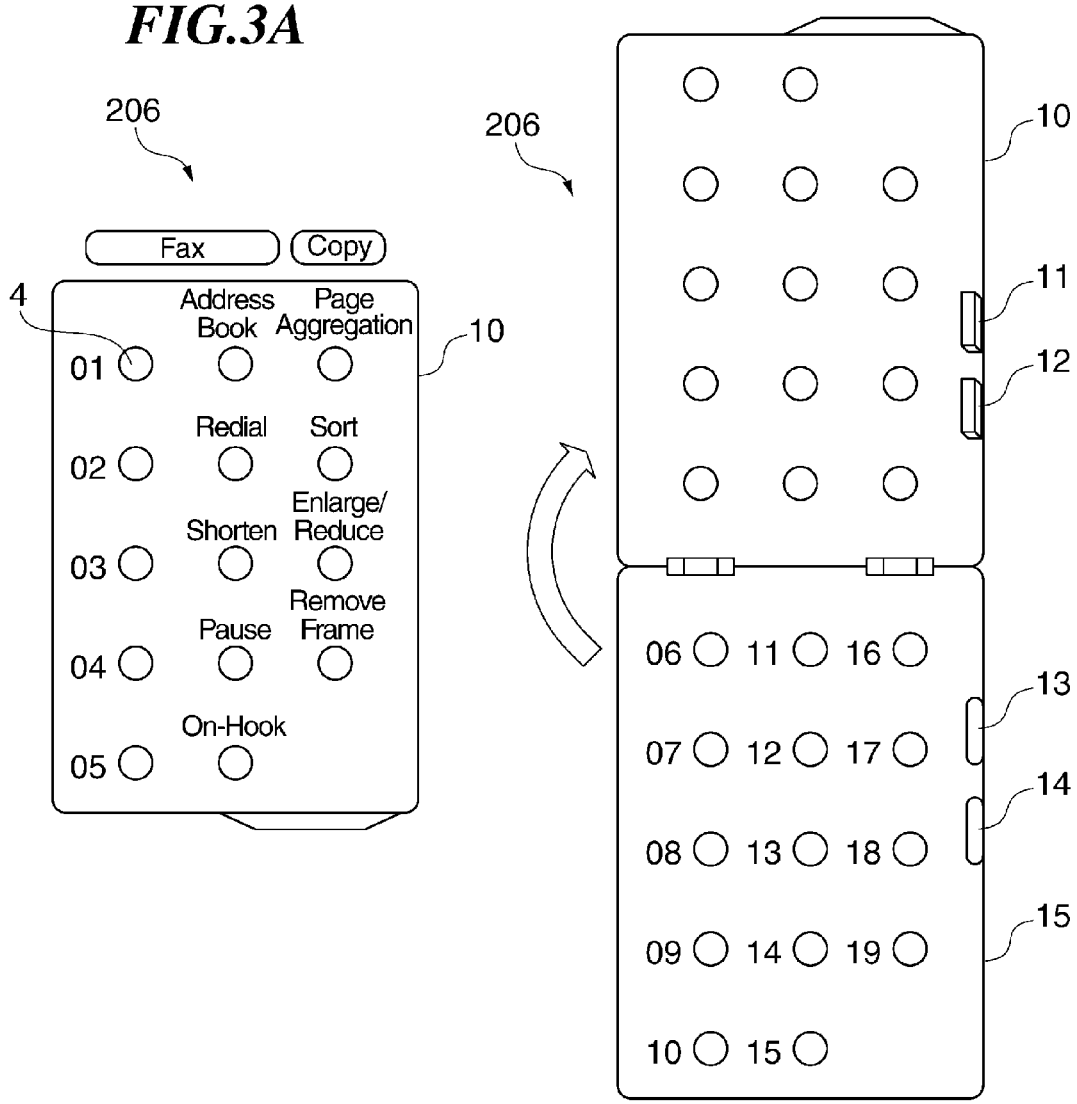

FIG.4

| COVER OPENING-CLOSING SENSING SWITCH 5 | COVER OPENING-CLOSING SENSING SWITCH 6 | STATE |
|---|---|---|
| OFF | OFF | NORMAL STATE (OPEN) |
| OFF | ON | MALFUNCTION STATE |
| ON | OFF | MALFUNCTION STATE |
| ON | ON | NORMAL STATE (CLOSED) |

ELECTRONIC DEVICE WITH KEYS, CONTROL METHOD THEREOF, AND STORAGE MEDIUM

BACKGROUND OF THE INVENTION

1. Field of the Invention

The present invention relates to an electronic device with keys, a control method thereof, and a storage medium, and more particularly, to an image forming apparatus, a control method thereof, and a storage medium.

2. Description of the Related Art

The image forming apparatus includes an operation panel, and the operation panel has an operation unit body, and a cover openably and closably attached to the operation unit body through a hinge. The cover covers a one-touch key group disposed on an exterior of the operation unit body and has another one-touch key group disposed on an outer surface thereof. The one-touch key group includes a numeric keypad, cursor keys, facsimile transmission function keys, copy function keys, one-touch keys, and the like. The operation panel further includes a cover opening-closing sensor that senses opening-closing of the cover.

There is a known technique in which different processes are dynamically allocated to at least one key of the key group according to opening-closing of the cover in the operation panel (see Japanese Laid-Open Patent Publication (Kokai) No. 2001-320550, for example).

There is also a technique in which generating a service error inhibits an image forming apparatus to be used when a sensing result of the cover opening-closing sensor is not normal, e.g., when the cover or the cover opening-closing sensor fails to operate properly. The limitation of the use of the image forming apparatus prevents the image processing apparatus from executing a process not intended by the user, such as wrong fax transmission of image data to a destination not intended by the use.

However, when the sensing result of the cover opening-closing sensor is not normal, inhibiting the use of the image forming apparatus without exception provides the following problem.

More specifically, a function of transmitting image data, such as a facsimile function, may cause an information leak as a result of transmission of the image data to a wrong destination, and hence it is desirable to inhibit the function from being used from the viewpoint of safety. Meanwhile, although a copying function may be executed in unintended setting the copy function is less in risk than the erroneous transmission of image data. Nevertheless, when the sensing result of the cover opening-closing sensor is not normal, inhibiting the facsimile function and the copy function from being used without exception reduces the usability more than necessary.

Originally, even though there is a key not related to opening-closing of the cover, e.g., a key in which the allocated function is not switched when the cover is opened or closed, inhibiting the entire apparatus from being used deteriorates the usability when the sensing result of the cover opening-closing sensor is not normal.

SUMMARY OF THE INVENTION

It is an object of the present invention to provide an electronic device with keys which is capable of improving the user's usability for the keys, wherein processes allocated to the keys can be switched, a control method of the electronic device, and a program.

In an aspect of the invention, there is provided an electronic device with a plurality of keys, the electronic device comprising: a switching unit configured to switch processes allocated to at least a part of the plurality of keys according to a predetermined operation; a determination unit adapted to determine whether or not the switching unit is in a normal state; an invalidation unit configured to invalidate a part of the plurality of keys in a case where the determination unit determines that the switching unit is not in the normal state; and an execution unit configured to execute, when the key not invalidated by the invalidation unit among the plurality of keys is pressed, a process allocated to the pressed key, in a case where the determination unit determines that the switching unit is not in the normal state.

According to the present invention, it is possible to improve the user's convenience for the keys in the electronic device that can switch processes allocated to the keys.

Further features of the present invention will become apparent from the following description of exemplary embodiments with reference to the attached drawings.

BRIEF DESCRIPTION OF THE DRAWINGS

FIG. 1 is a view schematically showing a configuration of an image forming apparatus as an electronic device according to an embodiment of the present invention.

FIG. 2 is a sectional view of an operation panel in FIG. 1.

FIGS. 3A and 3B are views which are useful for explaining a configuration of the operation panel of FIG. 2, FIG. 3A showing a case in which a cover of the operation panel is closed, and FIG. 3B showing a case in which the cover of the operation panel is open.

FIG. 4 is a view showing an opening-closing determination table of the cover in FIG. 2.

DESCRIPTION OF THE EMBODIMENTS

Figure 5A:
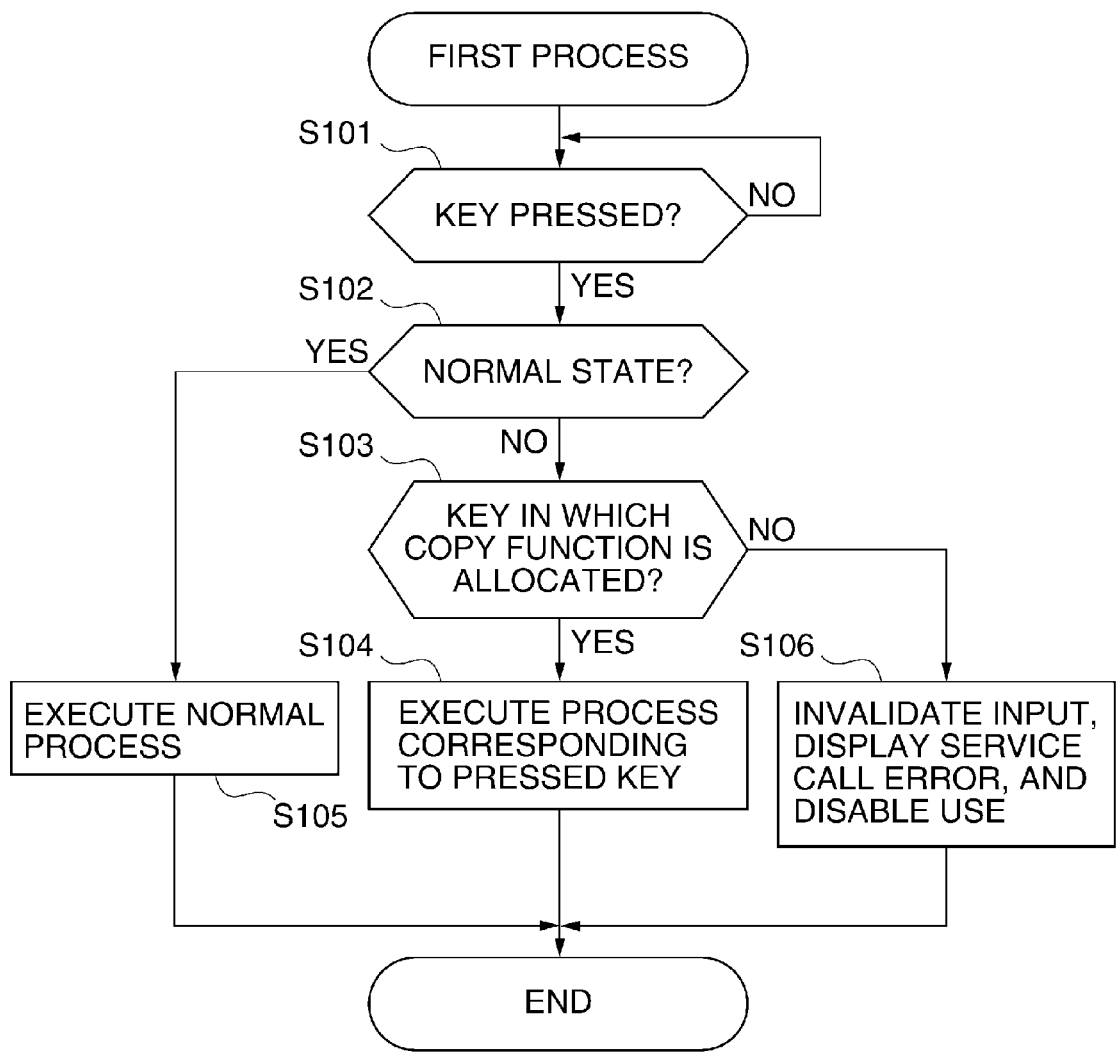
FIGS. 5A to 5C are flowcharts showing procedures of processes executed by the image processing apparatus of FIG. 1, FIG. 5A showing a first process which is executed by the image forming apparatus of FIG. 1, FIG. 5B showing a second process which is executed by the image forming apparatus of FIG. 1, and FIG. 5C showing a third process which is executed by the image forming apparatus of FIG. 1.

An embodiment of the present invention will now be described in detail with reference to the drawings.

FIG. 1 is a view schematically showing a configuration of an image forming apparatus as an electronic device according to the embodiment of the present invention.

In FIG. 1, an image forming apparatus 200 includes a CPU 201, a ROM 202, a RAM 203, an NIC (Network Interface Card) 204, a panel controller 205, a display controller 207, a printer unit 211, a scanner unit 212, and a modem 209, which are connected to one another through a system bus 213.

The image forming apparatus 200 further includes an operation panel 206, a display 208, and an NCU (Network Control Unit) 210. The operation panel 206 is connected to the panel controller 205, the display 208 is connected to the display controller 207, and the NCU 210 is connected to the modem 209. The NCU 210 is connected to a PSTN (Public Switched Telephone Network) 215.

The CPU 201 comprehensively controls the devices connected to the system bus 213 and executes a firmware module, as a control program, stored in the ROM 202. The CPU 201 also executes processes of FIGS. 5A to 5C, described later, based on the firmware module. The CPU 201 uses the RAM 203 as a work area, and the RAM 203 stores image data.

The panel controller 205 controls instruction input from the operation panel 206. The operation panel 206 includes a numeric keypad, cursor keys, facsimile transmission function keys, copy function keys, one-touch keys, and the like. Details of the one-touch keys will be described later.

The display controller 207 controls drawing on the display 208 as a display unit that displays information to the user. The display 208 is an LCD that can display, for example, character strings of 22 characters×5 lines, ruled lines, and scroll bars.

The NIC 204 is connected to a LAN 214, and the NIC 204 bi-directionally exchanges data with, for example, a server of email and files through the LAN 214.

The modem 209 modulates and demodulates signals necessary for facsimile communication. Signals modulated by the modem 209 are transmitted to the PSTN 215 through the NCU 210. Each of the modem 209 and the NCU 210 form a facsimile transmission unit.

The printer unit 211 electrophotographically forms an image on a recording sheet. The scanner unit 212 reads an image formed on a recording sheet. The scanner unit 212 may additionally include an auto document feeder, and in this case, the scanner unit 212 can automatically read a plurality of documents.

FIG. 2 is a sectional view of the operation panel in FIG. 1.

In FIG. 2, the operation unit 206 includes: an operation unit body having an exterior 15 and an operation unit base 16, and a cover 10 openably and closably attached to the exterior 15 through a hinge.

FIGS. 3A and 3B are views which are useful for explaining a configuration of the operation panel of FIG. 2, FIG. 3A showing a case in which the cover of the operation panel is closed, and FIG. 3B showing a case in which the cover of the operation panel is open.

In FIG. 3A, the cover 10 has a one-touch key group disposed on an outer surface thereof. The one-touch key group includes fourteen input keys. As shown in FIG. 3A, the fourteen input keys are allocated to facsimile functions or copy functions.

The keys allocated to the facsimile functions are arranged in the left two columns, which are keys corresponding to one-touch keys "01" to "05", "Address Book", and the like. Meanwhile, the keys allocated to the copy functions are arranged in the right column, which correspond to "Page Aggregation", and the like.

For example, a one-touch key 4 is for inputting input content indicating a one-touch dial number "01" in a state where the cover 10 is closed and is for inputting input content indicating a one-touch dial number "06" in a state where the cover 10 is open, for each of which a destination can be registered.

In FIG. 3B, the exterior 15 has other one-touch keys disposed on an upper surface thereof, and the cover 10 covers the one-touch key group disposed on the exterior 15 when the cover 10 is closed. The cover 10 has protrusions 11 and 12 disposed on an inner edge thereof, and the exterior 15 includes openings 13 and 14 through which the protrusions 11 and 12 penetrate when the cover 10 is closed.

As shown in FIG. 2, the operation unit base 16 has the cover opening-closing sensing switches 5 and 6 implemented thereon, and the openings 13 and 14 are disposed just above cover opening-closing sensing switches 5 and 6.

The protrusion 12 is adapted to push the cover opening-closing sensing switch 5 through the opening 13 when the cover 10 is closed.

Moreover, the protrusion 11 is adapted to press the cover opening-closing sensing switch 6 through the opening 14 when the cover 10 is closed.

The cover opening-closing sensing switches 5 and 6 report an electrically on-state exhibited when the cover 10 is closed to allow the protrusions 11 and 12 to press the switches 5 and 6, and report an electrically off-state exhibited when the cover 10 is opened to prevent the protrusions 11 and 12 from pressing the switches 5 and 6, to the CPU 201 through the panel controller 205.

According to the above-mentioned construction, if the cover opening-closing sensing switches 5 and 6 are normal, the cover opening-closing sensing switches 5 and 6 are turned off in a state where the cover 10 is open, and the cover opening-closing sensing switches 5 and 6 are turned on in a state where the cover 10 is closed.

In this way, the operation unit 206 includes a plurality of one-touch keys pressed by the user. The cover 10 and the cover opening-closing sensing switches 5 and 6 correspond to a switching unit that switches processes (input content that is input to the image forming apparatus 200 when the user presses any one of the keys) allocated to at least a part of the plurality of keys according to predetermined operation.

FIG. 4 is a view showing an opening-closing determination table of the cover 10 of FIG. 2.

In FIG. 4, the opening-closing determination table shows on-off states of the cover opening-closing sensing switches 5 and 6 and states of the cover 10.

As shown in FIG. 4, when both the cover opening-closing sensing switches 5 and 6 are turned off, the cover 10 is in an open state (normal state) as shown in the field of "State" of the table, whereas when both the cover opening-closing sensing switches 5 and 6 are turned on, the cover 10 is in a closed state (normal state) as shown in the field of "State" of the table.

On the other hand, when both the sensing results of the cover opening-closing sensing switches 5 and 6 are different from each other, it is determined that the cover opening-closing sensing switches 5 and 6 are not in a normal state (malfunction state) as shown in "State" of the table.

For example, if the cover opening-closing sensing switch 5 fails to operate properly to be always turned on, the cover opening-closing sensing switch 6 is turned off when the cover 10 is in the open state, which makes it to be determined that the cover 10 or the cover opening-closing sensing switches 5 and 6 are in the malfunction state.

It should be noted that an example of the malfunction of the cover opening-closing sensing switches 5 or 6 includes poor contact, and an example of the malfunction of the cover 10 includes abrasion of the protrusions 11 or 12.

The opening-closing determination table is stored in the ROM 202 as a table or is implemented on the image forming apparatus 200 so as to cause the process to branch, using IF statements, switch statements, and the like of a program according to the opening-closing determination table.

Figure 5B:
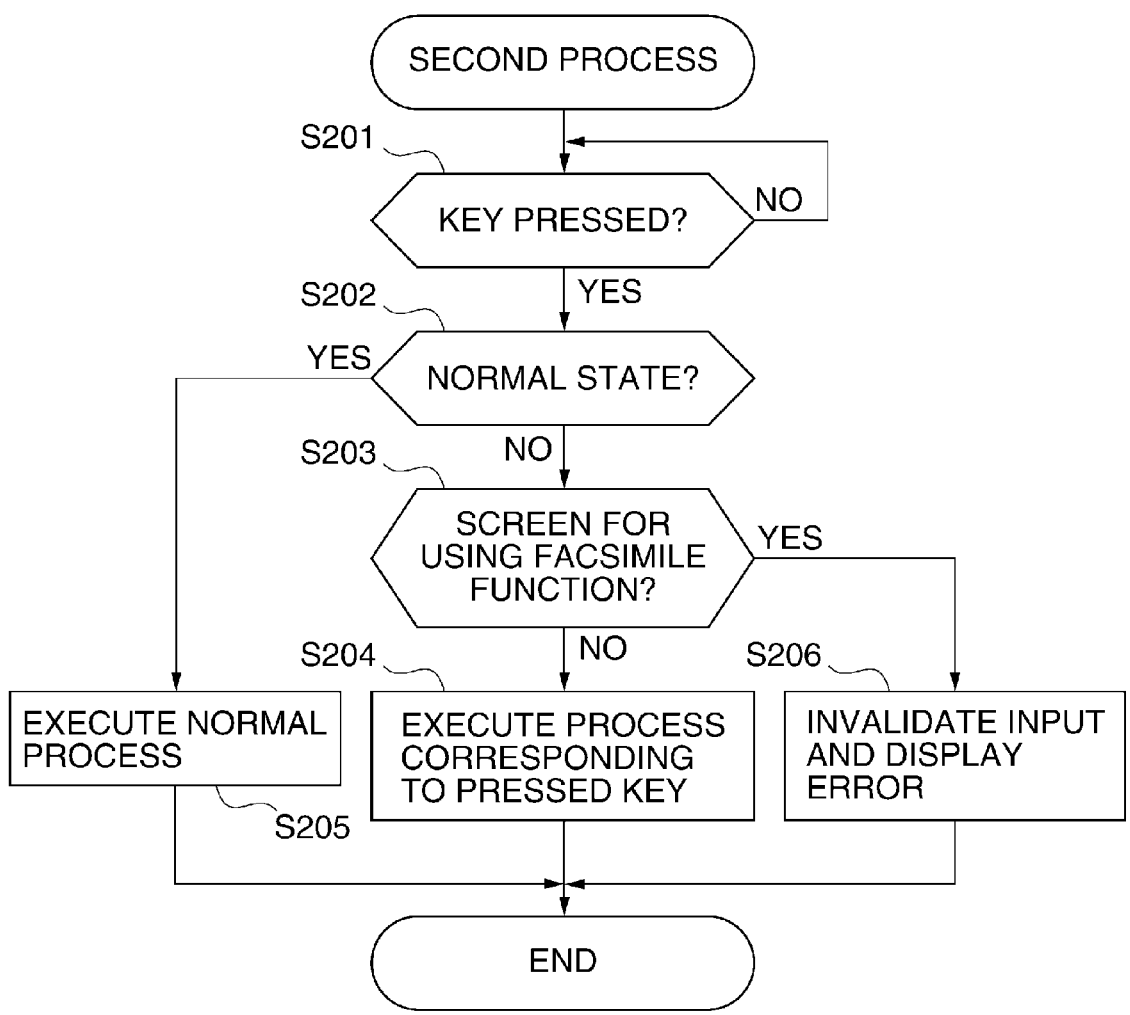
Figure 5C:
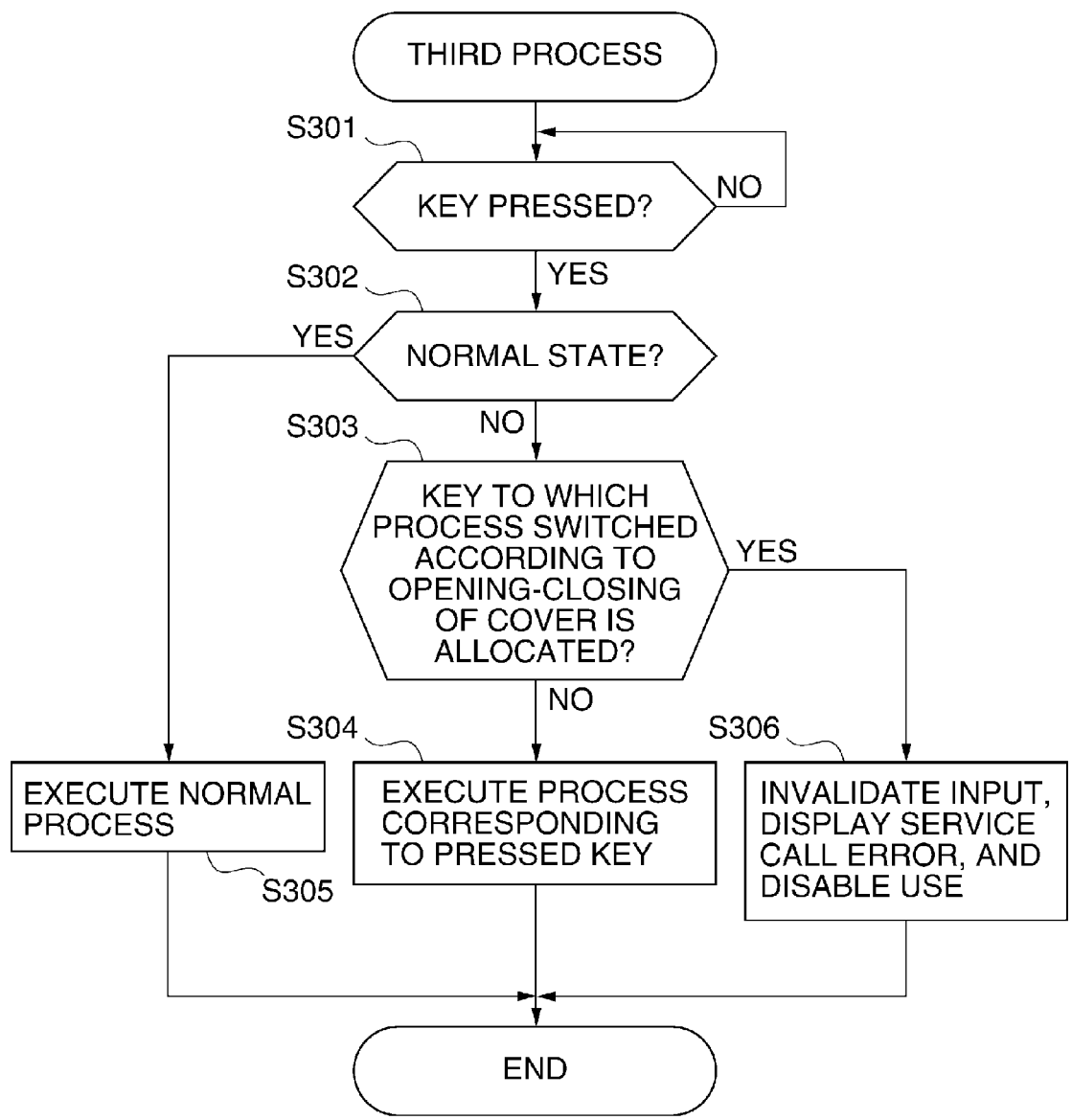

FIGS. 5A to 5C are flowcharts showing procedures of processes executed by the image processing apparatus of FIG. 1.

FIG. 5A shows a first process which is executed by the image forming apparatus 200 of FIG. 1, and the image forming apparatus 200 executes the process of FIG. 5A.

In FIG. 5A, if any one of the keys of the operation unit 206 is pressed (YES to step S101), it is determined whether or not the cover opening-closing sensing switches 5 and 6 are in a normal state according to the sensing results of the cover opening-closing sensing switches 5 and 6 and the opening-closing determination table of FIG. 3 (step S102).

As a result of the determination of step S102, if the cover opening-closing sensing switches 5 and 6 are not in a normal state (NO to step S102), it is determined whether or not the function allocated to the pressed key is a copy function (step S103), followed by the program being terminated.

As a result of the determination of step S103, if the function allocated to the pressed key is a copy function (YES to step S103), the process corresponding to the pressed key is executed (step S104), followed by the program being terminated.

On the other hand, if the function allocated to the pressed key is not a copy function as a result of the determination of step S103 (NO to step S103), the input is invalidated because a facsimile may be transmitted to a wrong destination, and the image forming apparatus 200 is inhibited to be used while displaying an error screen for a service call on the display 208 (step S106), followed by the program being terminated. It is assumed in the present embodiment that a facsimile function is allocated if the function is not a copy function.

As a result of the determination of step S102, if the cover opening-closing sensing switches 5 and 6 are in a normal state (YES to step S102), a usual process (allocated to the pressed key) is executed (step S105), followed by the program being terminated.

Although the above embodiment is directed to an example of executing the determination of step S103 when it is determined that the cover opening-closing sensing switches 5 and 6 are not in a normal state, the following configuration may also be employed. More specifically, the determination of step S103 may be executed after step S101, and the determination of step S102 may be executed in a case of NO to step S103. In this case, the program proceeds to step S106 in a case of NO to step S102, whereas the program proceeds to step S104 in a case of YES to step S103.

FIG. 5B shows a second process which is executed by the image processing apparatus of FIG. 1, and the image forming apparatus 200 executes the process of FIG. 5B.

In FIG. 5B, if any one of the keys of the operation unit 206 is pressed (YES to step S201), it is determined whether or not the cover opening-closing sensing switches 5 and 6 are in a normal state according to the sensing results of the cover opening-closing sensing switches 5 and 6 and the opening-closing determination table of FIG. 3 (step S202).

As a result of the determination of step S202, if the cover opening-closing sensing switches 5 and 6 are not in a normal state (NO to step S202), it is determined whether or not a screen for using a facsimile function is displayed on the display 208 (step S203).

As a result of the determination of step S203, if the screen for using a copy function is displayed instead of a screen for using a facsimile function (NO to step S203), the process corresponding to the pressed key is executed (step S204), followed by the progam being terminated.

On the other hand, as a result of the determination of step S203, if the screen for using a facsimile function is displayed (YES to step S203), input of destination by one-touch keys is invalidated, and an error screen is displayed on the display 208 (step S206), followed by the program being terminated.

As a result of the determination of step S202, if the cover opening-closing sensing switches 5 and 6 are in a normal state (YES to step S202), a usual process (allocated to the pressed key) is executed (step S205), followed by the program being terminated.

Although the above embodiment is directed to an example of executing the determination of step S203 when it is determined that the cover opening-closing sensing switches 5 and 6 are not in a normal state, the following configuration may also be employed. More specifically, the determination of step S203 may be executed after step S201, and the determination of step S202 may be executed in a case of YES to step S203. In this case, the program proceeds to step S206 in a case of NO in step S202, whereas the program proceeds to step S204 in a case of YES to step S203.

FIG. 5C shows a third process which is executed by the image processing apparatus of FIG. 1, and the image forming apparatus 200 executes the process of FIG. 5C.

In FIG. 5C, if any one of the keys of the operation unit 206 (not particularly limited to the one-touch keys here) is pressed (YES to step S301), it is determined whether or not the cover opening-closing sensing switches 5 and 6 are in a normal state according to the sensing results of the cover opening-closing sensing switches 5 and 6 and the opening-closing determination table of FIG. 3 (step S302).

As a result of the determination of step S302, if the cover opening-closing sensing switches 5 and 6 are not in a normal state (NO to step S302), it is determined whether or not the pressed key is a key of enabling the function allocated according to opening-closing of the cover to be switched (step S303).

As a result of the determination of step S303, if the pressed key is not a key of enabling the function allocated according to opening-closing of the cover to be switched (NO to step S303), the process corresponding to the pressed key is executed (step S304), followed by the program being terminated.

On the other hand, if the pressed key is a key of enabling the function allocated according to opening-closing of the cover to be switched as a result of the determination of step S303 (YES to step S303), the input is invalidated because a wrong process may be executed, and the image forming apparatus 200 is inhibited from being used while displaying an error screen for a service call on the display 208 (step S306), followed by the program being terminated.

Returning to the process of step S302, if the cover opening-closing sensing switches 5 and 6 are in a normal state as a result of the determination of step S302 (YES to step S302), a usual process (allocated to the pressed key) is executed (step S305), followed by the program being terminated.

Moreover, although the above embodiment is directed to an example of performing the determination of step S303 when it is determined that the cover opening-closing sensing switches 5 and 6 are not in a normal state, the following configuration may also be employed. More specifically, the determination of step S303 may be executed after step S301, and the determination of step S302 may be executed in a case of YES. In this case, the program proceeds to step S306 in a case of NO to step S302, whereas the program proceeds to step S304 in a case of NO to S303.

The embodiment of the present invention described above includes two cover opening-closing sensing switches to detect malfunction. However, for example, there may be also be employed a cover opening-closing sensing sensor that indicates a positive potential when the cover is open, indicates a negative potential when the cover is closed, and indicates a zero output when there is a malfunction.

Although, in the embodiment of the invention, there is illustrated a case in which the copy functions and the facsimile functions share the one-touch keys, the present embodiment may also be applied when functions other than the copy functions share the one-touch keys. Examples of the functions other than the copy functions include a dialing function of acquiring or holding a telephone line, which is a general function of the image forming apparatus, and a transmission function of transmitting e-mail to a selected destination.

Although, in the embodiment of the invention, the processes allocated to the one-touch keys are switched according to opening-closing of the cover, a shift key may be separately provided, thereby allowing different processes to be dynamically switched according to whether or not the shift key is pressed.

Although, in the embodiment of the invention, there is described an example of applying the electronic device to the image forming apparatus, there may be applied an electronic device including a switching unit that switches the input content input to the electronic device when the user presses a key.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-128532, filed Jun. 19, 2013 which is hereby incorporated by reference herein in its entirety.

What is claimed is:

1. An electronic device with first keys to be covered with a cover and second keys disposed on an exterior of the cover, wherein one of the first keys is selected when pressed directly in a state where the cover is open, and selected when one of the second keys corresponding the one of the first keys is pressed in a state where the cover is closed, the electronic device comprising:
a switching unit configured to switch at least one process allocated to at least a part of the first keys according to opening-closing of the cover;
a determination unit adapted to determine whether or not the at least one process is correctly switched by said switching unit;
an invalidation unit configured to invalidate a part of the first keys in a case where said determination unit determines that the at least one process is not correctly switched by said switching unit; and
an execution unit configured to execute, when a key not invalidated by the invalidation unit among the first keys is selected, a process allocated to the selected key, in a case where said determination unit determines that the at least one process is not correctly switched by said switching unit.

2. The electronic device according to claim 1, wherein said invalidation unit invalidates at least one key, to which at least one process related to a predetermined function is allocated, among the first keys, and does not invalidate at least one key, to which at least one process related to a function other than the predetermined function is allocated, among the first keys.

3. The electronic device according to claim 2, wherein the predetermined function is a transmission function of transmitting image data.

4. The electronic device according to claim 2, wherein the function other than the predetermined function is a copy function.

5. The electronic device according to claim 1, wherein said invalidation unit invalidates at least one key among the first keys, in a case where at least one process allocated thereto is to be switched by said switching unit, and does not invalidate at least one key among the first keys, in a case where at least one process allocated thereto is not to be switched by said switching unit.

6. An electronic device with first keys to be covered with a cover and second keys disposed on an exterior of the cover, wherein one of the first keys is selected when pressed directly in a state where the cover is open, and selected when one of the second keys corresponding the one of the first keys is pressed in a state where the cover is closed, the electronic device comprising:
a switching unit configured to switch at least one process allocated to at least a part of the first keys according to opening-closing of the cover;
a determination unit configured to determine whether or not the at least one process is correctly switched by said switching unit when one of the first keys included in the plurality of keys is selected;
a display unit configured to display an error screen without executing a process allocated to the one of the keys first when said determination unit determines that the at least one process is not correctly switched by said switching unit; and
an execution unit configured to execute, when another one of the first keys different from the one of the first keys is selected, a process allocated to the selected another one of the first keys without said determination unit performing the determination.

7. The electronic device according to claim 6, wherein the one of the first keys is a key in which the allocated process is switched by said switching unit, and the another one of the first keys is a key in which the allocated process is not switched by said switching unit.

8. A control method of an electronic device with keys to be covered with a cover and second keys disposed on an exterior of the cover, wherein one of the first keys is selected when pressed directly in a state where the cover is open, and selected when one of the second keys corresponding the one of the first keys is pressed in a state where the cover is closed and a switching unit configured to switch at least one process allocated to at least a part of the first of keys according to opening-closing of the cover, the control method comprising:
a determination step of determining whether or not the at least one process is correctly switched by said switching unit;
an invalidation step of invalidating a part of the first keys in a case where it is determined in said determination step that the at least one process is not correctly switched by said switching unit; and
an execution step of executing, when a key not invalidated in said invalidation step among the first keys is selected, a process allocated to the selected key in a case where it is determined in said determination step that the at least one process is not correctly switched by said switching unit.

9. A control method of an electronic device with first keys to be covered with a cover and second keys disposed on an exterior of the cover, wherein one of the first keys is selected when pressed directly in a state where the cover is open, and selected when one of the second keys corresponding the one of the first keys is pressed in a state where the cover is closed and a switching unit configured to switch at least one process allocated to at least a part of the first keys according to opening-closing of the cover, the control method comprising:
- a determination step of determining whether or not the at least one process is correctly switched by said switching unit in a case where one of the first keys included in the plurality of keys is selected;
- a display step of displaying an error screen without executing a process allocated to the one of the keys first when it is determined in said determination step that the at least one process is not correctly switched by the switching unit; and
- an execution step of executing, when another one of the first keys different from the one of the first keys is selected, a process allocated to the selected another one of the first keys without performing the determination in said determination step.

10. A non-transitory storage medium storing a program causing a computer to execute a control method of an electronic device with keys to be covered with a cover and second keys disposed on an exterior of the cover, wherein one of the first keys is selected when pressed directly in a state where the cover is open, and selected when one of the second keys corresponding the one of the first keys is pressed in a state where the cover is closed and a switching unit configured to switch at least one process allocated to at least a part of the first of keys according to opening-closing of the cover, the control method comprising:
- a determination step of determining whether or not the at least one process is correctly switched by said switching unit;
- an invalidation step of invalidating a part of the first keys in a case where it is determined in said determination step that the at least one process is not correctly switched by said switching unit; and
- an execution step of executing, when a key not invalidated in said invalidation step among the first keys is selected, a process allocated to the selected key in a case where it is determined in said determination step that the at least one process is not correctly switched by said switching unit.

11. A non-transitory storage medium storing a program causing a computer to execute a control method of the electronic device with first keys to be covered with a cover and second keys disposed on an exterior of the cover, wherein one of the first keys is selected when pressed directly in a state where the cover is open, and selected when one of the second keys corresponding the one of the first keys is pressed in a state where the cover is closed and a switching unit configured to switch at least one process allocated to at least a part of the first keys according to opening-closing of the cover, the control method comprising:
- a determination step of determining whether or not the at least one process is correctly switched by said switching unit in a case where one of the first keys included in the plurality of keys is selected;
- a display step of displaying an error screen without executing a process allocated to the one of the keys first when it is determined in said determination step that the at least one process is not correctly switched by the switching unit; and
- an execution step of executing, when another one of the first keys different from the one of the first keys is selected, a process allocated to the selected another one of the first keys without performing the determination in said determination step.

* * * * *